(12) United States Patent
Bei et al.

(10) Patent No.: US 9,807,372 B2
(45) Date of Patent: Oct. 31, 2017

(54) FOCUSED IMAGE GENERATION SINGLE DEPTH INFORMATION FROM MULTIPLE IMAGES FROM MULTIPLE SENSORS

(71) Applicant: HTC Corporation, Taoyuan County (TW)

(72) Inventors: Jing-Jo Bei, Taoyuan County (TW); Heng-Chien Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 286 days.

(21) Appl. No.: 14/178,286

(22) Filed: Feb. 12, 2014

(65) Prior Publication Data
US 2015/0229913 A1    Aug. 13, 2015

(51) Int. Cl.
*H04N 13/02* (2006.01)
*H04N 5/232* (2006.01)

(52) U.S. Cl.
CPC ..... *H04N 13/0271* (2013.01); *H04N 5/23212* (2013.01)

(58) Field of Classification Search
CPC ............ H04N 13/0271; H04N 5/23212; G06T 7/0075
See application file for complete search history.

(56) References Cited

U.S. PATENT DOCUMENTS

| | | | | |
|---|---|---|---|---|
| 5,488,674 A * | 1/1996 | Burt | ............... | G06T 5/50 345/639 |
| 6,288,742 B1 * | 9/2001 | Ansari | ............... | H04N 5/232 348/14.08 |
| 8,619,148 B1 * | 12/2013 | Watts | ............... | G06T 5/006 348/218.1 |
| 2001/0013895 A1 * | 8/2001 | Aizawa | ............... | G06T 5/50 348/222.1 |
| 2002/0026118 A1 * | 2/2002 | Govari | ............... | A61B 5/0422 600/462 |

(Continued)

FOREIGN PATENT DOCUMENTS

| | | |
|---|---|---|
| CN | 1465196 | 12/2003 |
| CN | 1926851 | 3/2007 |

(Continued)

OTHER PUBLICATIONS

"Office Action of Taiwan Counterpart Application", issued on Apr. 23, 2015, p. 1-p. 5.

(Continued)

*Primary Examiner* — Jay Patel
*Assistant Examiner* — Joseph Suh
(74) *Attorney, Agent, or Firm* — JCIPRNET

(57) ABSTRACT

An image processing device including an image sensor array, an image pre-processing unit, a depth information generator, and a focusing unit is provided. The image sensor array takes multiple images of a first object and a second object. The image pre-processing unit processes the images to generate two shift images associated with the two objects. The depth information generator generates depth information according to the two shift images. The depth information includes distance information associated with the first object. The focusing unit generates a pair of focused images that have the first object focused thereon according to the depth information and the two shift images.

21 Claims, 12 Drawing Sheets

(56) References Cited

U.S. PATENT DOCUMENTS

| | | | | |
|---|---|---|---|---|
| 2002/0097324 A1* | 7/2002 | Onuki | H04N 5/2259 | 348/208.99 |
| 2003/0055532 A1* | 3/2003 | Sakagami | G06N 3/008 | 700/245 |
| 2003/0103683 A1* | 6/2003 | Horie | G06T 7/30 | 382/284 |
| 2004/0070778 A1* | 4/2004 | Matama | G06T 5/004 | 358/1.9 |
| 2006/0285741 A1* | 12/2006 | Subbarao | G06T 5/50 | 382/154 |
| 2008/0007626 A1* | 1/2008 | Wernersson | G03B 13/26 | 348/211.9 |
| 2008/0115562 A1* | 5/2008 | Haino | G01C 25/005 | 73/1.37 |
| 2008/0175507 A1* | 7/2008 | Lookingbill | G06K 9/228 | 382/255 |
| 2008/0303894 A1* | 12/2008 | Ernst | G06T 7/571 | 348/43 |
| 2009/0284584 A1* | 11/2009 | Wakabayashi | H04N 13/0003 | 348/44 |
| 2010/0141802 A1* | 6/2010 | Knight | H04N 5/23212 | 348/240.3 |
| 2011/0169994 A1* | 7/2011 | DiFrancesco | G02B 13/16 | 348/340 |
| 2011/0249153 A1* | 10/2011 | Hirook | B60R 1/00 | 348/241 |
| 2012/0038785 A1* | 2/2012 | Cheng | H04N 5/23232 | 348/222.1 |
| 2012/0170658 A1* | 7/2012 | Anderson | H04N 19/895 | 375/240.16 |
| 2012/0212722 A1* | 8/2012 | Smith | G03F 7/7055 | 355/67 |
| 2012/0314937 A1* | 12/2012 | Kim | H04N 13/0033 | 382/154 |
| 2012/0327259 A1* | 12/2012 | Tamura | G06T 5/009 | 348/222.1 |
| 2013/0222577 A1* | 8/2013 | Yamanaka | G01C 3/06 | 348/135 |
| 2013/0223759 A1* | 8/2013 | Nishiyama | G06T 5/50 | 382/284 |
| 2013/0229532 A1* | 9/2013 | Tsutsumi | H04N 5/232 | 348/187 |
| 2013/0329120 A1* | 12/2013 | Hiasa | H04N 5/23212 | 348/345 |
| 2014/0085434 A1* | 3/2014 | Ogura | H04N 13/04 | 348/51 |
| 2014/0226039 A1* | 8/2014 | Yamamoto | H04N 5/23212 | 348/239 |
| 2015/0049079 A1* | 2/2015 | Ding | G06T 11/60 | 345/419 |
| 2015/0215601 A1* | 7/2015 | Zhou | H04N 13/042 | 348/43 |

FOREIGN PATENT DOCUMENTS

| | | |
|---|---|---|
| CN | 101119499 | 2/2008 |
| CN | 102457740 | 5/2012 |
| JP | 2013238927 | 11/2013 |
| TW | 201216203 | 4/2012 |
| WO | 2013166215 | 11/2013 |
| WO | 2014002492 | 1/2014 |

OTHER PUBLICATIONS

"Office Action of German Counterpart Application", issued on Aug. 4, 2015, p. 1-p. 12.

"Office Action of China Counterpart Application," issued on Jun. 19, 2016, p. 1-p. 12.

* cited by examiner

FOCUSED IMAGE GENERATION SINGLE DEPTH INFORMATION FROM MULTIPLE IMAGES FROM MULTIPLE SENSORS

BACKGROUND OF THE DISCLOSURE

1. Technical Field

The present disclosure generally relates to an image processing device, in particular, to an image processing device that may generate depth information of images and may generate large-sized two-dimensional (2D) images and stereoscopic three-dimensional (3D) images suitable for the observation of human eyes according to the depth information.

2. Description of Related Art

Traditional cameras implement automatic focusing and obtain depth information by employing a single lens and a single image sensor, and by employing a voice coil motor (VCM) to trigger the lens to move forward and backward, so as to be prepared for the generation of 2D images and 3D images. However, the VCM moves slowly, wastes power and generates noise. These flaws make the completion of the function of generating depth information requiring more time and power. And the image input using multiple cameras or image matrices cannot conquer the problems of acquiring large-sized 2D images simultaneously, how to process a plurality of complex image inputs, and how to generate stereoscopic 3D images suitable for the observation of human eyes in real time.

The users of cameras expect to shoot large-sized 2D images, such as images of 10 mega pixels. The images taken by multiple cameras or image matrices may make the obtaining of depth information become easy, but the image output size of multiple cameras or image matrices is usually small, such as only 1 mega pixels for each image, and the multiple small-sized images need to have the same focusing plane. How to generate clear and large-sized 2D images is a big challenge.

When a plurality of input images have different imaging planes combining with a function of optical zoom, the problem of how to generate stereoscopic 3D images suitable for the observation of human eyes in real time may bring about more complex challenges. Especially, when the objects in which the user is interested are moving around, it makes the usage of an image input camera using multiple cameras or image matrices become more difficult.

SUMMARY OF THE DISCLOSURE

The present disclosure is directed to an image processing device coordinated with multiple image sensors or image matrices to input images with different focusing planes. And the image processing device uses digital image processing technique to generate large-sized 2D images and stereoscopic 3D images suitable for the observation of human eyes simultaneously and in real time, which may achieve the functions of quickness and power saving. The above-mentioned image processing device also includes multiple application functions achieved according to depth information.

The image processing device of the present disclosure includes an image sensor array, an image pre-processing unit, a depth information generator, and a focusing unit. The image sensor array includes a plurality of image sensors for taking multiple images of a first object and a second object. The image pre-processing unit is coupled to the image sensor array and configured to receive the multiple images and process the multiple images to generate a first shift image and a second shift image associated with the first object and the second object. The depth information generator is coupled to the image pre-processing unit and configured to generate depth information according to the first shift image and the second shift image. The depth information includes first distance information associated with the first object. The focusing unit is coupled to the image pre-processing unit and the depth information generator and configured to generate a first pair of focused images that have the first object focused thereon according to the depth information, the first shift image, and the second shift image.

DESCRIPTION OF THE EMBODIMENTS

Figure 1:
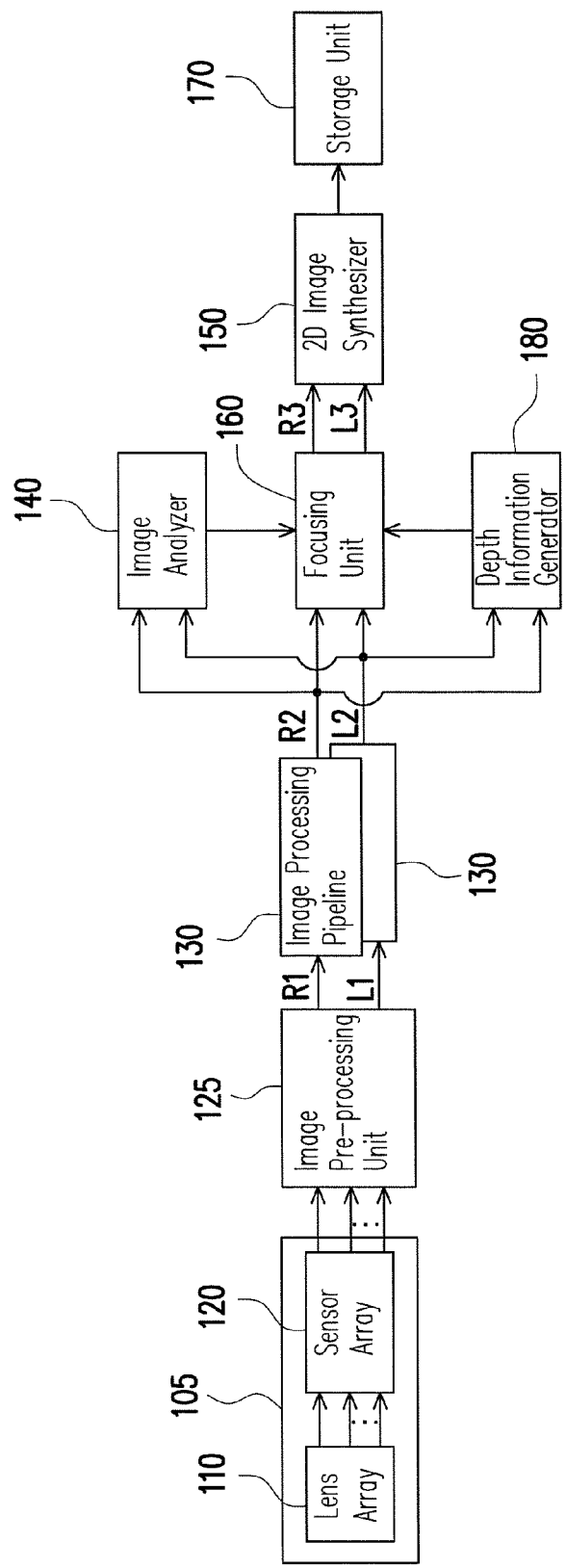
FIG. 1 is a diagram of an image processing device according to an embodiment of the present disclosure.

FIG. 1 is a diagram of an image processing device 100 according to an embodiment of the present disclosure. The image processing device 100 may be a digital camera, a digital video camera, or an electronic device having a function of camera and/or video camera, such as a personal digital assistant (PDA), a smart phone or a tablet computer. The image processing device 100 includes an image sensor array 105, an image pre-processing unit 125, a plurality of image processing pipelines 130, an image analyzer 140, a focusing unit 160, a depth information generator 180, a 2D image synthesizer 150, and a storage unit 170, wherein the image sensor array 105 includes a lens array 110 and a sensor array 120. The sensor array 120 is coupled to the lens array 110. The image pre-processing unit 125 is coupled to the sensor array 120. The image processing pipelines 130 are coupled to the image pre-processing unit 125. The image analyzer 140, the focusing unit 160, and the depth information generator 180 are coupled to the image processing pipelines 130 respectively. The 2D image synthesizer 150 is coupled to the focusing unit 160. The storage unit 170 is coupled to the 2D image synthesizer 150.

The sensor array 120 may include a plurality of image sensors (such as a plurality of cameras) configured to take multiple images of one or more objects in the same scene and output the multiple images to the image pre-processing unit 125. In the sensor array 120, the focal length of each image sensor may be fixed or variable, and each image sensor may use a fixed lens, a liquid lens, a crystal lens or a micro-lens array. The focal lengths of image sensors in the sensor array 120 may be identical or different. In other words, the above-mentioned multiple images taken by the sensor array 120 may have the same focal plane or a plurality of different focal planes.

The lens array 110 may include multiple optical zoom lenses, and these optical zoom lenses may be corresponding to the multiple image sensors in the sensor array 120 one by one. Each optical zoom lens is disposed in front of the corresponding sensor. These optical zoom lenses may zoom in distant objects in the above-mentioned images to enhance the gradation of the distant objects.

The image pre-processing unit 125 may receive the multiple images taken by the sensor array 120, and process the above multiple images to generate two shift images R1 and L1 associated with the above-mentioned one or more objects. The shift images R1 and L1 may be assumed to be the images respectively corresponding to the right eye and the left eye of a user.

In detail, the image pre-processing unit 125 may correct the image geometric planes of the above multiple images taken by the sensor array 120, and classify the above multiple images into two image groups corresponding to the right eye and the left eye according to physical relative locations and focusing planes of the above multiple images. Then, the image pre-processing unit 125 may synthesize multiple images in a first image group into a single image enlarging output (e.g. multi-frame super resolution) according to an optical characteristic of each image in the first image group, so as to generate the shift image R1 corresponding to the right eye. Similarly, the image pre-processing unit 125 may synthesize multiple images in a second image group into a single image enlarging output according to the optical characteristic of each image in the second image group, so as to generate the shift image L1 corresponding to the left eye.

The above-mentioned single image enlarging output is formed by synthesizing multiple small images to a larger image, such as synthesizing two 5 mega pixels images to a 10 mega pixels image. The multiple image sensors of the sensor array 120 may shoot multiple images at the same time (i.e. synchronously), and then the image pre-processing unit 125 may use a single image enlarging output technique and the above multiple images to generate shift images R1 and L1 with high resolution.

In addition, the image pre-processing unit 125 may further support high dynamic range (HDR) technique. Traditional HDR technique is to use different exposure values for shooting multiple images in the same scene at different time, and then synthesize them to one image, so as to show a broader range of light and shade in a single image. The multiple image sensors of the sensor array 120 may respectively take multiple images with different exposure values at the same time, and then the image pre-processing unit 125 may use HDR technique to generate shift images R1 and L1 with a broader range of light and shade according to the multiple images. The above multiple images are shot at the same time, which is more efficient and has a better effect, such as minimizing the influence of user's hand-shake.

Figure 2:
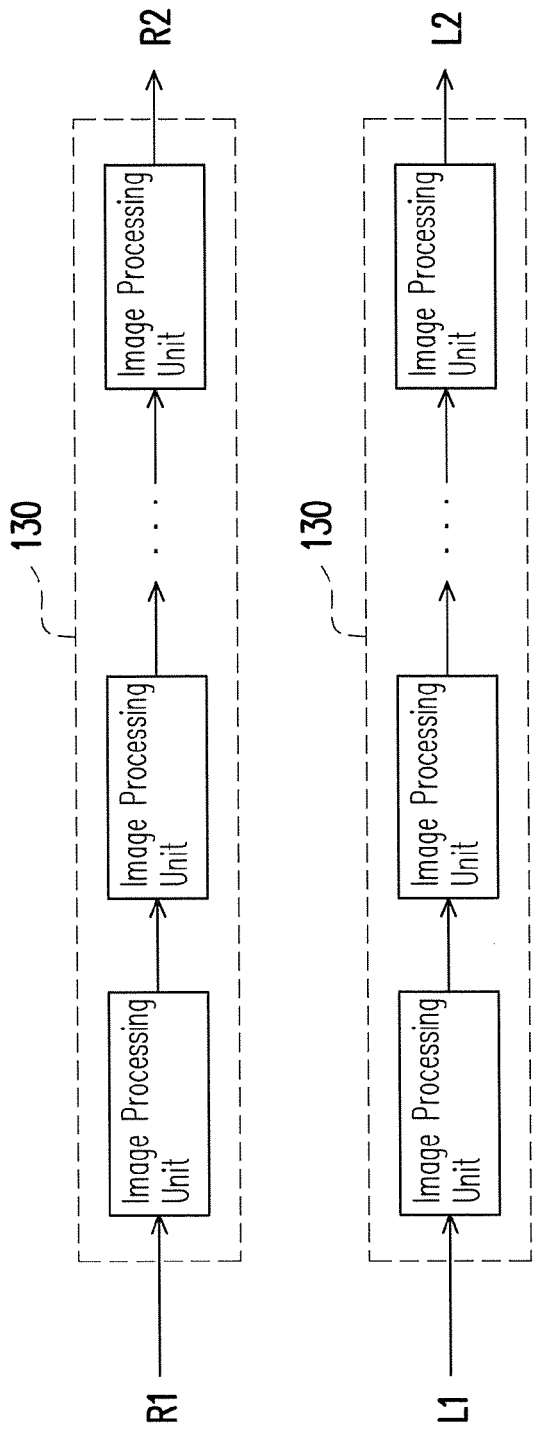
FIG. 2 and FIG. 3 are diagrams of image processing pipelines according to an embodiment of the present disclosure.

The image processing pipelines 130 is shown in FIG. 2. In this embodiment, the image processing device 100 may include at least two image processing pipelines 130, wherein one of the image processing pipelines 130 may receive the shift image R1 from the image pre-processing unit 125, and another one of the image processing pipelines 130 may receive the shift image L1 from the image pre-processing unit 125. Each image processing pipeline 130 includes multiple image processing units, which are connected in serial order and may perform multi-stage image processing to its received shift image R1 (or L1) in order and output the shift image R2 (or L2) corresponding to the shift image R1 (or L1). Further, the first image processing unit of each image processing pipeline 130 receives shift image R1 (or L1) as an output, and the rest of each image processing unit receives the output of its preceding image processing unit as an input. These image processing units perform a series of image processing to the shift image R1 (and L1). In the following explanation, the two shift images respectively received by two image processing pipelines 130 are represented by R1 and L1, while the two shift images respectively outputted by the two image processing pipelines 130 are represented by R2 and L2. The above two image processing pipelines 130 output shift images R2 and L2 to the image analyzer 140, the focusing unit 160, and the depth information generator 180.

Figure 3:
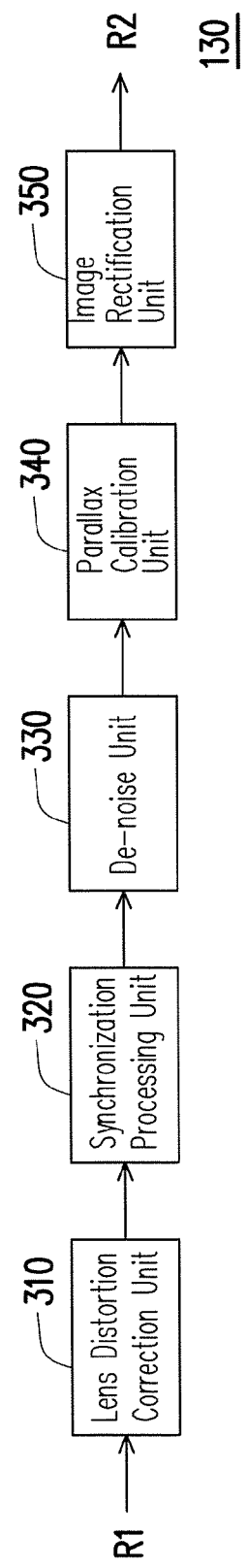

For instance, each image processing pipeline 130 may be shown as in FIG. 3, wherein the image processing unit may include a lens distortion correction unit 310, a synchronization processing unit 320, a de-noise unit 330, a parallax calibration unit 340, and an image rectification unit 350, which are coupled in serial order. The following explanation takes the image processing pipeline 130 at the top of FIG. 2 as an example. For the explanation of the image processing pipeline 130 at the bottom of FIG. 2, it only needs to change the shift images R1 and R2 into shift images L1 and L2.

The lens distortion correction unit 310 corrects the fish-eye effect, an effect that straight lines are slightly bended after shooting, in the shift image R1.

The synchronization processing unit 320 corrects and reduces a difference between the shift images R1 and L1. The above difference may be a shooting time difference, an exposure value difference, a color difference, a white balance difference or a focusing plane difference in the image sensors of the sensor array 120.

The de-noise unit 330 may filter out noises in the shift image R1, including luminance noise and color noise.

The parallax calibration unit 340 corresponding to the shift image R1 may determine a cropping frame and its location, and cut out the part that is outside the cropping frame on the shift image R1 and keep the part that is inside the cropping frame on the shift image R1. Similarly, the parallax calibration unit 340 corresponding to the shift image L1 may determine another cropping frame and its location, and cut out the part that is outside the cropping frame on the shift image L1 and keep the part that is inside the cropping frame on the shift image L1. To build the required parallax effect between the two shift images L1 and R1, the parallax calibration unit 340 may put the cropping frames on different locations of the shift image R1 and the shift image L1 to make the view of each shift image slightly different.

Figure 4:
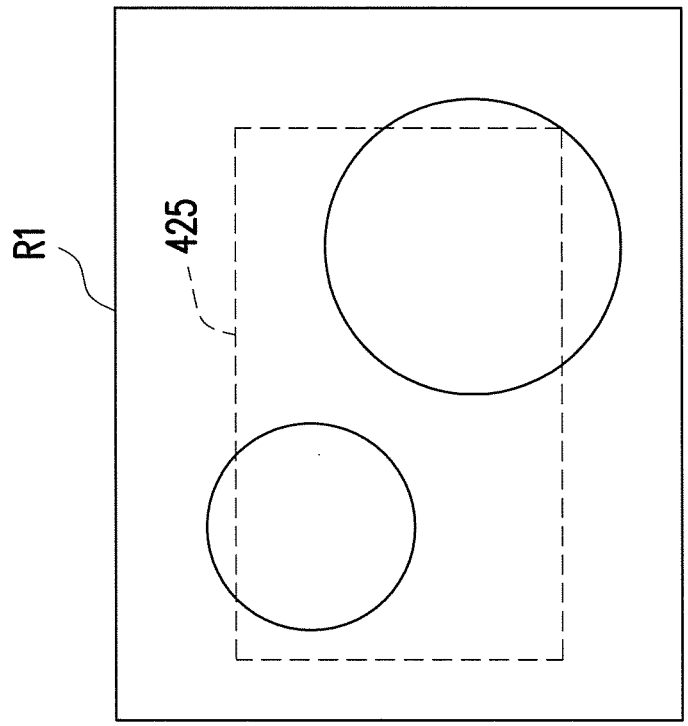
FIG. 4 is a diagram of parallax calibration according to an embodiment of the present disclosure.
Figure 4:
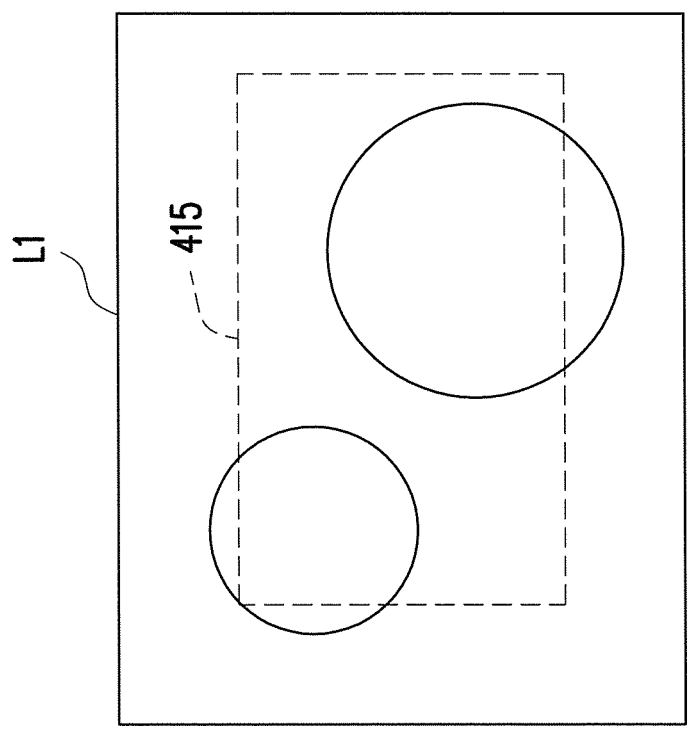

For example, in the embodiment shown in FIG. 4, the two parallax calibration units 340 of the two image processing pipelines 130 may respectively determine cropping frames 415 and 425 on the shift images L1 and R1, and they may determine the locations of the two cropping frames. The two locations of the cropping frames 415 and 425 are different. If they are put in the same image, a small distance may occur between the two cropping frames 415 and 425. This distance is determined according to the distance between multiple lenses of the multiple image sensors of the sensor array 120. Therefore, each parallax calibration unit 340 may determine the cropping frame and its location on the shift image according to the above distance between the multiple lenses, so as to build the parallax effect.

The multiple lenses of the multiple image sensors of the sensor array 120 should be installed on the same plane, and the installing angles of the above multiple lenses should be identical. For example, the upper side of the view of each lens should be directed to the same direction, and should not have deviation of rotation angles. However, in the manufacturing process, it is hard to avoid the deviation of installing angles, and the installing position of each lens may not on the same plane. The image rectification unit 350 may rectify the distortion caused by the above installing positions and/or installing angles in the shift image R1. For example, an affine transform can be used to rectify the distortion mentioned above.

Figure 5:
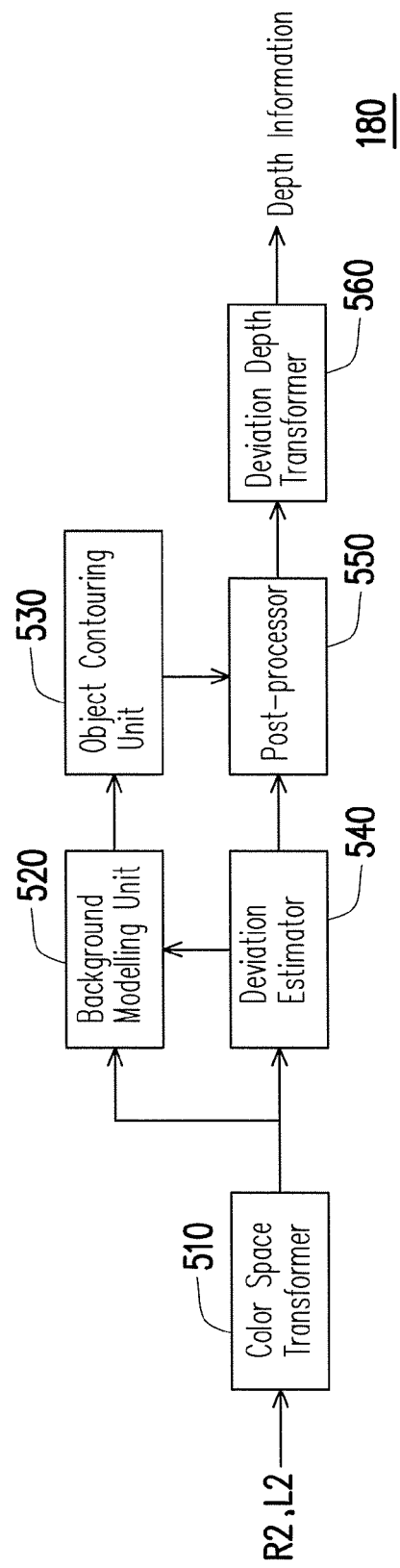
FIG. 5 is a diagram of a depth information generator according to an embodiment of the present disclosure.

FIG. 5 illustrates a further detail of the depth information generator 180. The depth information generator 180 includes a color space transformer 510, a background modelling unit 520, an object contouring unit 530, a deviation estimator 540, a post-processor 550 and a deviation depth transformer 560. The color space transformer 510 is coupled to each image processing pipeline 130. The background modeling unit 520 and the deviation estimator 540 are respectively coupled to the color space transformer 510. The object contouring unit 530 is coupled to the background modelling unit 520. The post-processor 550 is coupled to the object contouring unit 530 and the deviation estimator 540. The deviation depth transformer 560 is coupled between the post-processor 550 and the focusing unit 160.

The depth information generator 180 is configured to generate depth information (such as a depth map) according to the shift images R2 and L2. This depth information includes distance information related to every object that is shot by the sensor array 120. For example, the above distance information may be a distance between a corresponding object and a lens of an image sensor, and this distance may be called as a depth or a depth value.

Figure 6B:
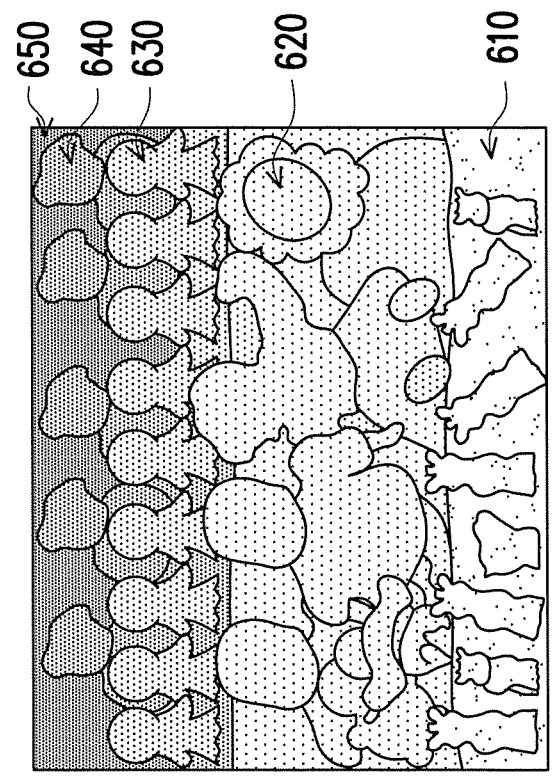
FIG. 6A and FIG. 6B are diagrams of depth information according to an embodiment of the present disclosure.
Figure 6A:
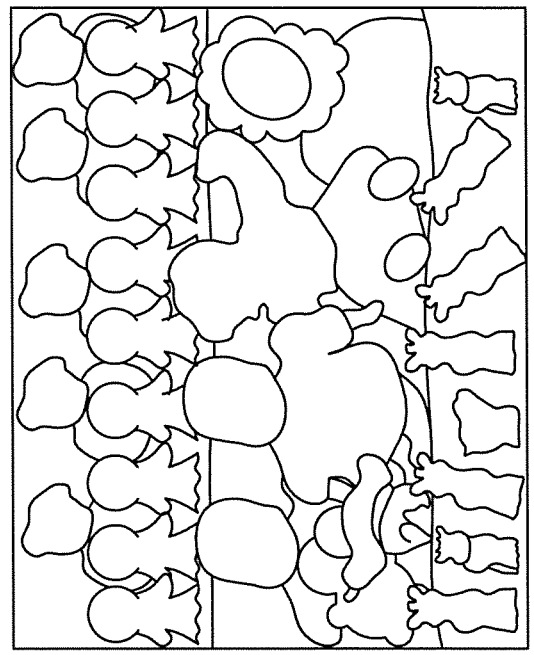

FIG. 6A and FIG. 6B are diagrams of depth information according to an embodiment of the present disclosure. FIG. 6A is a scene shot by the sensor array 120 with multiple objects (such as multiple dolls). The depth information corresponding to the scene and generated by the depth information generator 180 is shown in FIG. 6B. The depth information may be a 2D matrix constructed by depth values, wherein each depth value is a depth value associated with a corresponding object located on the same location of the shift images R2 and L2. The depth values in FIG. 6B are transformed into corresponding gray levels to be shown easily. The objects in FIG. 6A may be classified into five levels corresponding to five areas 610-650 in FIG. 6B respectively, wherein the grayer the area, the farer the distance.

The following explains each unit of the depth information generator 180. The color space transformer 510 may transform the shift images R2 and L2 from a first color space to a second color space. The above first color space does not include luminance components, such as RGB or CMYK, and the second color space includes luminance components and at least one color component, such as YUV or YCbCr. The sensor array 120 in this embodiment shoots images using the RGB color space. If the sensor array 120 can shoot images using a color space that includes luminance components, such as the YUV color space, then the color space transformer 510 may be omitted.

The deviation estimator 540 may generate deviation information (such as a disparity map) according to the luminance components (such as Y component in the YUV color space) of the shift images R2 and L2. This deviation information includes a deviation value between the objects in the shift images R2 and L2. The said deviation value represents a difference between two points, which are the same point of the same object at different locations on different images. The object closer to the lens may have a larger deviation value, and thus the depth information can be derived through adding the distance between the lenses of the image sensors to the deviation value. The deviation estimator 540 may detect and estimate the deviation value of the above object to generate the deviation information. The deviation information may be similar to the 2D matrix in FIG. 6B by changing the depth values to deviation values.

The background modelling unit 520 may distinguish the foreground and the background of the shift images R2 and L2 according to at least one color component (such as U component and V component in the YUV color space) of the shift images. The above foreground refers to the part that the user may be more interested in, and the background refers to the less important part. Since the parallax of the view of each image sensor in the sensor array 120 is not huge, the background modelling unit 520 may only take out information of the foreground or the background from one of the shift images R2 and L2.

In the embodiment of FIG. 5, the background modelling unit 520 is also coupled to the deviation estimator 540. The background modelling unit 520 may compute depths of objects according to the deviation information generated by the deviation estimator 540, and distinguish the foreground and the background according to the depths.

The object contouring unit 530 may extract object contours from the above foregrounds, and the post-processor 550 may modify the deviation information according to the above object contour, especially, it may modify object contour information in the deviation information.

The post-processor 550 is responsible for modifying the deviation information generated by the deviation estimator 540. According to the object contour taken by the object contouring unit 530 from the above foreground, the post-processor 550 may modify foreground object contour of the deviation information, i.e. modify protruding and rugged parts of the foreground object contour in the deviation information, so as to smooth the foreground object contour in the deviation information.

In addition, the post-processor 550 may repair singularity points of the foreground and the background in the deviation information. The deviation information may be a 2D matrix similar to a 2D image, for example, there are three or five adjacent points surrounding each point on the edge of the matrix, and there are eight adjacent points surrounding each point inside the matrix. If a difference value between the deviation values of a point and any of its adjacent point is larger than a threshold value, the point is seen as a singularity point. The post-processor 550 may use the mean of all deviation values of the adjacent points of the said point to substitute the deviation value of the said point.

The deviation depth transformer 560 may transform the deviation information modified by the post-processor 550 into the depth information, so as to provide the depth information to the focusing unit 160.

Figure 7:
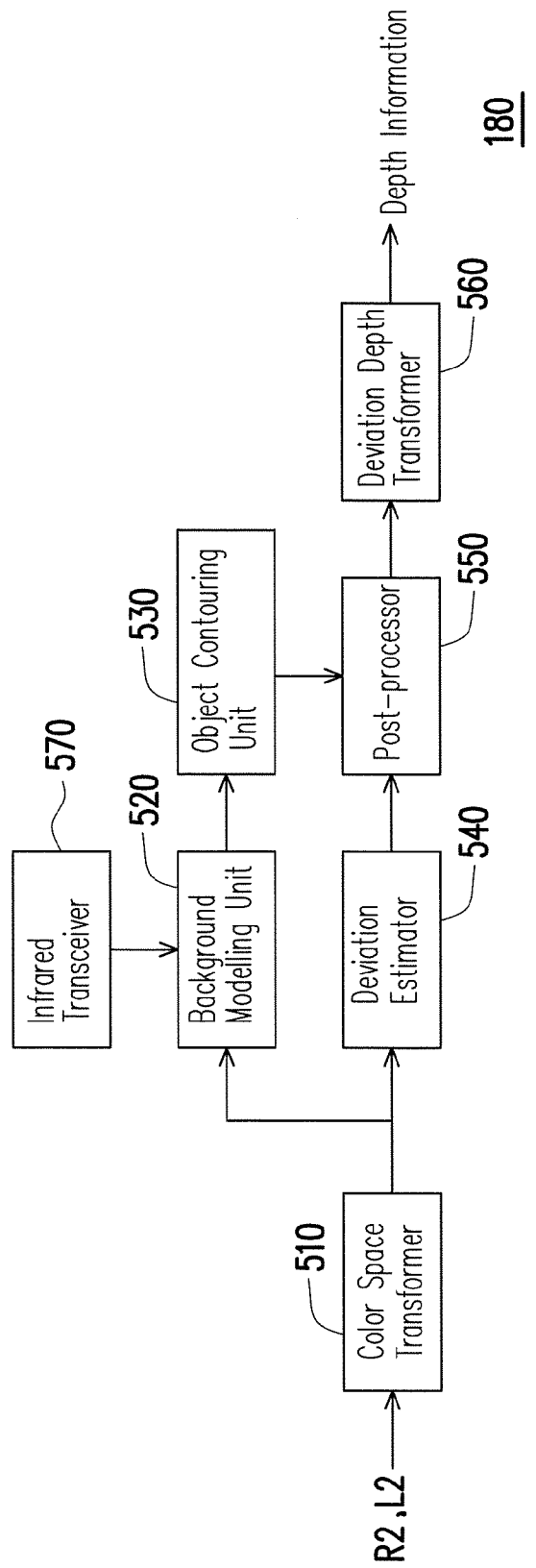
FIG. 7 is a diagram of a depth information generator according to another embodiment of the present disclosure.
Figure 8:
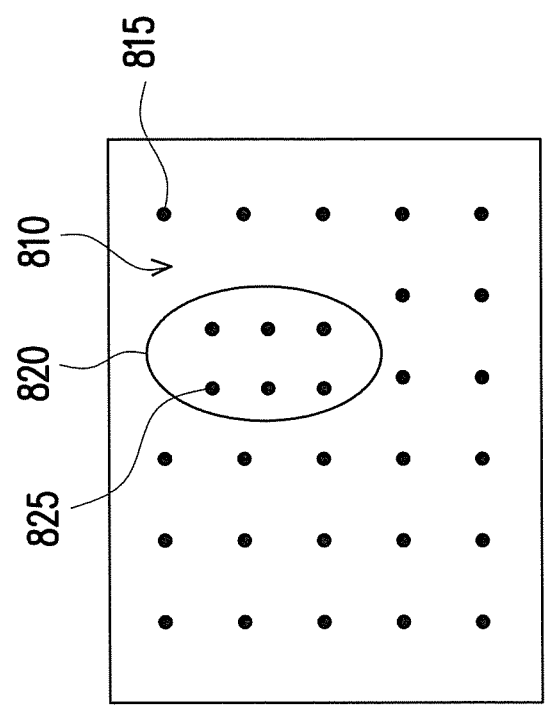
FIG. 8 is a diagram of light spots reflected by infrared according to an embodiment of the present disclosure.

FIG. 7 is a further detail of the depth information generator 180 according to another embodiment of the present disclosure. The depth information generator 180 in this embodiment further includes an infrared transceiver 570 coupled to the background modelling unit 520. The infrared transceiver 570 may transmit infrared and sense reflecting light spots reflected by the infrared. As show in FIG. 8, FIG. 8 illustrates an infrared image sensed by the infrared transceiver 570 of this embodiment, wherein a background 810 has multiple reflecting light spots 815, and a foreground 820 has another multiple reflecting light spots 825. Since the distance of the foreground is closer, the reflecting light spots 825 of the foreground 820 may be larger and brighter and the reflecting light spots 815 of the background 810 may be smaller and darker. The background modelling unit 520 may distinguish the above foreground and the background according to the difference of the reflecting light spots mentioned above.

The focusing unit 160 may generate two focused images R3 and L3 of the object that is designated or concerned by the user according to the depth information, the shift images R2 and L2, and/or lens parameter of each above-mentioned image sensor. The above focused images R3 and L3 have the same object focused thereon simultaneously. The above lens parameter includes a focal length and a point spread function associated with the lens of the image sensor. The lens parameter of each image sensor may be identical or different.

Figure 9A:
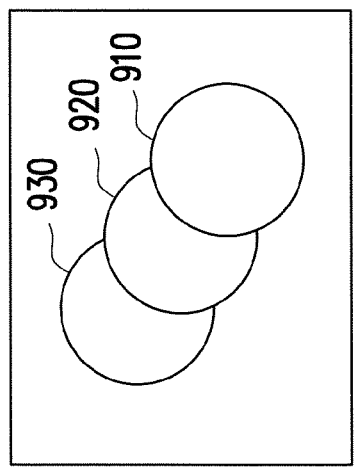
FIG. 9A to FIG. 9D are diagrams of focused images according to an embodiment of the present disclosure.
Figure 9B:
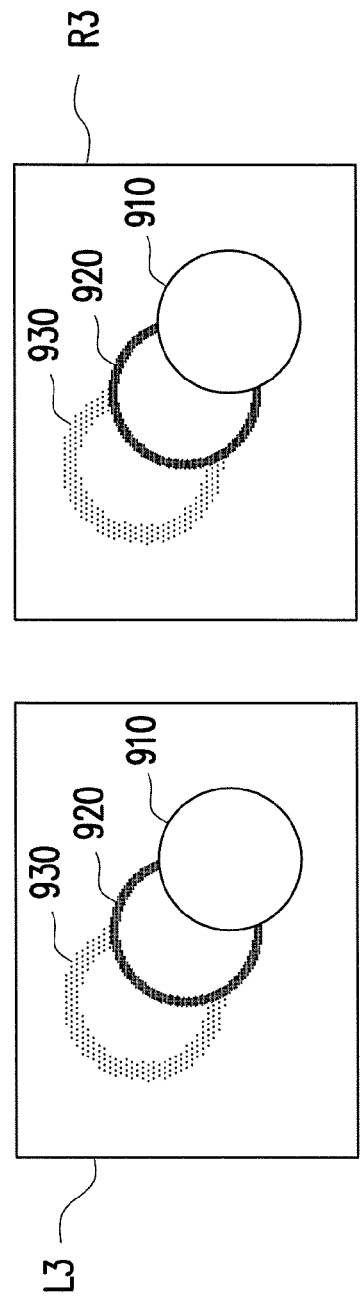
Figure 9C:
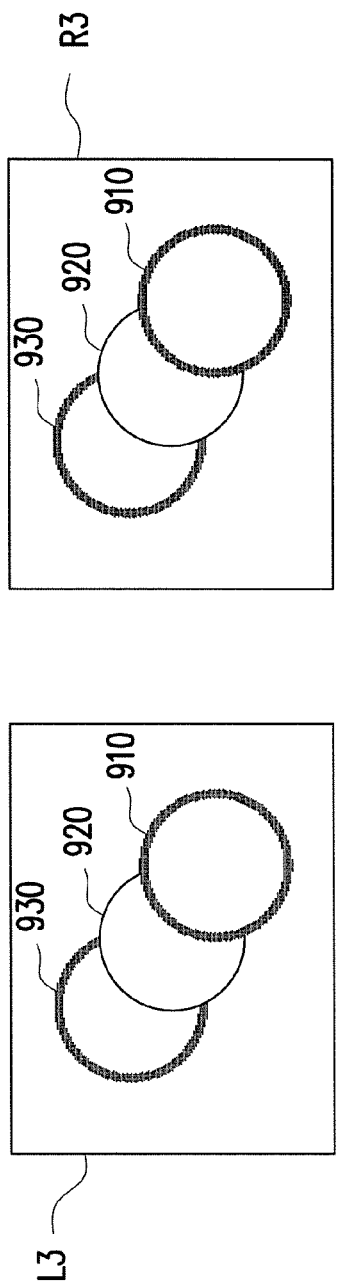
Figure 9D:
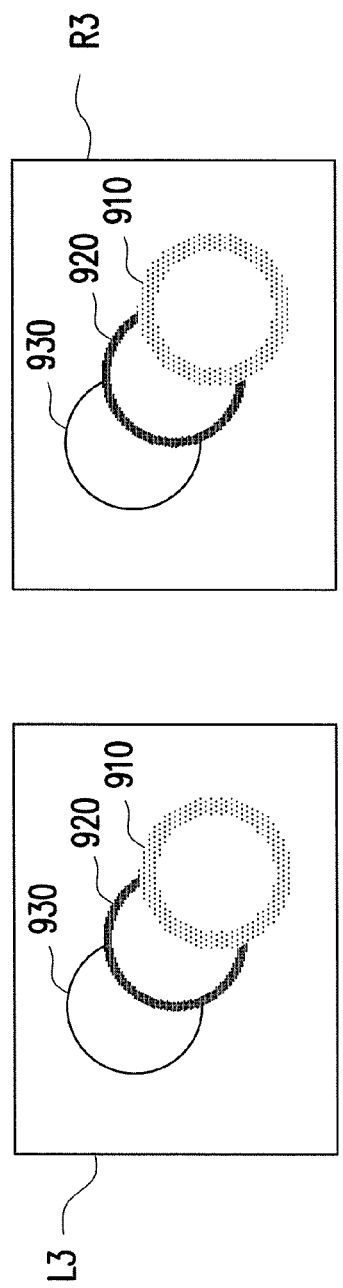

FIG. 9A to FIG. 9D is an embodiment of the above focused images. FIG. 9A is a scene with three objects 910~930 shot by the image processing device 100. In this embodiment, the focusing unit 160 generates three pairs of focused images R3 and L3, which have the objects 910~930 focused thereon, respectively, according to the depth information generated by the depth information generator 180. As shown in FIG. 9B, the focused images R3 and L3 that have the object 910 focused thereon have a clear object 910 and vague objects 920 and 930. As shown in FIG. 9C, the focused images R3 and L3 that have the object 920 focused thereon have a clear object 920 and vague objects 910 and 930. As shown in FIG. 9D, the focused images R3 and L3 that have the object 930 focused thereon have a clear object 930 and vague objects 910 and 920.

The theory that the focusing unit 160 may generate focused images having any object focused thereon is based on the thesis "A New Sense for Depth of Field" published by A. P. Pentland on IEEE Transactions on Pattern Analysis and Machine Intelligence, 9(4):523-531, 1987. This thesis illustrates relations of depth information of an image, a focusing plane depth, and a lens parameter. The focusing plane depth and the lens parameter are obtained during the hardware designs of the image processing device 100, and the depth information is from the depth information generator 180.

The image analyzer 140 may provide a smart-type spontaneous focusing function. In detail, the image analyzer 140 may identify locations of one or more objects in the shift images R2 and/or L2, such as human faces or areas with features, so as to generate location information associated with the above one or more objects, wherein the focusing unit 160 generates a pair or more pairs of focused images associated with the above one or more objects according to the above location information. Aside from being spontaneously identified by the image analyzer 140, the above focused objects may also be designated by the user.

For example, in the embodiment in FIG. 9A to 9D, the image analyzer 140 may identify the objects 910~930 on the shift images R2 and L2 and transmit location information of the objects 910~930 to the focusing unit 160. Therefore, the focusing unit 160 may focus on the objects 910~930 respectively according to the received location information to generate the three pairs of focused images R3 and L3 as shown in FIG. 9B~9D.

The image processing device 100 may shoot static images or dynamic video, wherein the dynamic video is a combination of static images shot consecutively. In an embodiment of the present disclosure, the image sensor array 105 may shoot multiple images consecutively. The image analyzer 140 may track one or more objects consecutively on the shift images R2 and L2, such as human faces or moving objects, and provide the location information of these objects for the focusing unit 160 to generate focused images. Aside from being spontaneously identified by the image analyzer 140, the above focused objects may also be designated by the user. For example, if a pedestrian walks from the back of the shooting scene to the front, the user may designate the pedestrian as a focused object, and the focusing unit 160 may track and focus consecutively, such that the focus may move along with the pedestrian no matter where he walks to.

Referring back to FIG. 1, the 2D image synthesizer 150 may receive the focused images R3 and L3 from the focusing unit 160 and perform an image interpolation on the focused images R3 and L3 so as to generate a 2D synthesized image. The resolution of the above synthesized image may be larger or equal to the resolution of the focused images R3 and L3. The storage unit 170 may receive and store the above synthesized image, and it may also store one or more information of the above depth map, focusing depth, and lens parameter. If the image processing device 100 is shooting dynamic video, the storage unit 170 may encode consecutive synthesized images as video and store the video.

Figure 10:
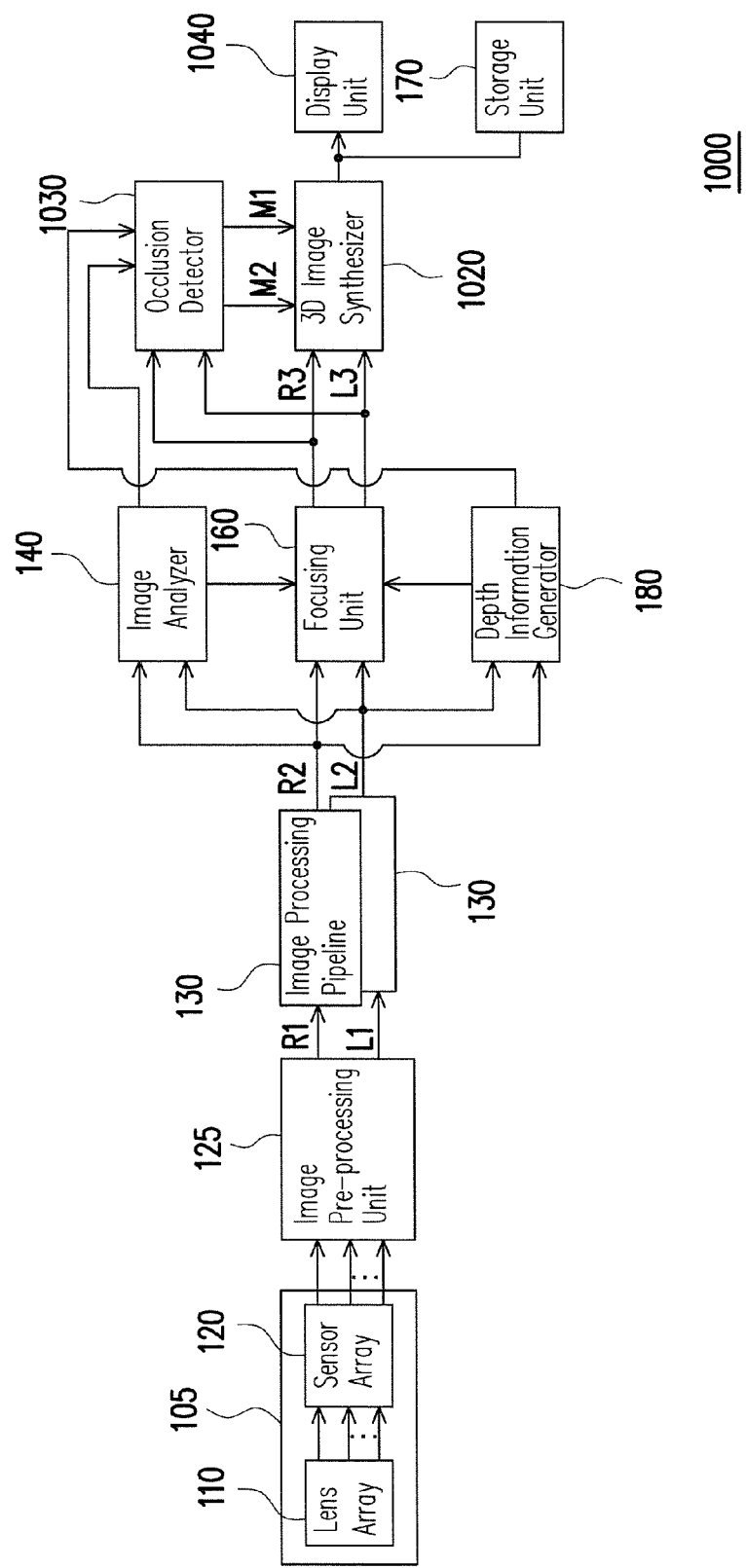
FIG. 10 is a diagram of an image processing device according to another embodiment of the present disclosure.

FIG. 10 is a diagram of an image processing device 1000 according to another embodiment of the present disclosure. The image processing device 1000 includes an image sensor array 105, an image pre-processing unit 125, a plurality of image processing pipelines 130, an image analyzer 140, a focusing unit 160, a depth information generator 180, a 3D image synthesizer 1020, an occlusion detector 1030, a display unit 1040, and a storage unit 170, wherein the image sensor array 105, the image pre-processing unit 125, the plurality of image processing pipelines 130, the image analyzer 140, the focusing unit 160, and the depth information generator 180 are identical to the corresponding elements in FIG. 1 respectively, and their descriptions are omitted. The occlusion detector 1030 is coupled to the image analyzer 140, the focusing unit 160, and the depth information generator 180. The 3D image synthesizer 1020 is coupled to the occlusion detector 1030 and the focusing unit 160. The display unit 1040 and the storage unit 170 are both coupled to the 3D image synthesizer 1020.

Figure 11:
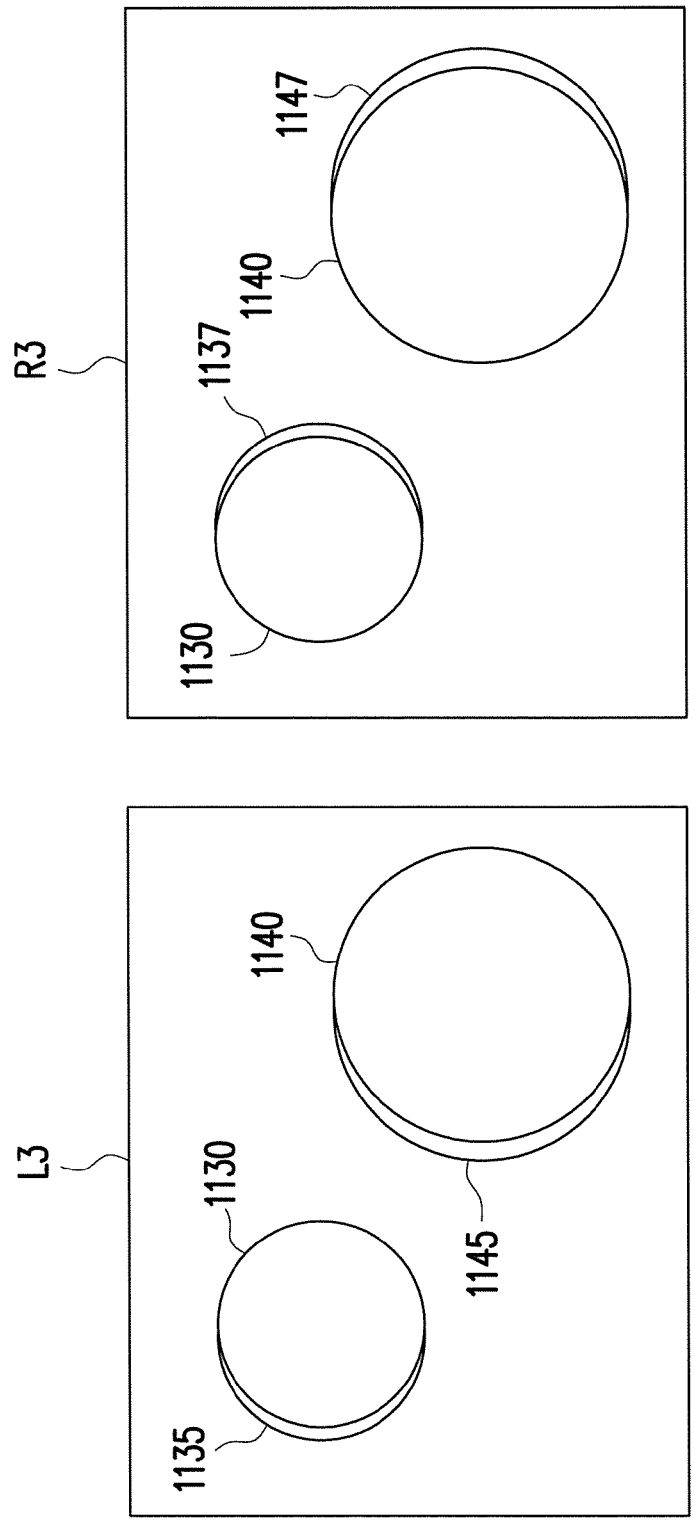
FIG. 11 is a diagram of occlusions according to an embodiment of the present disclosure.

The occlusion detector 1030 may receive the focused images R3 and L3 from the focusing unit 160, the location information associated with the object and output from the image analyzer 140, and the depth information output from the depth information generator 180. And the occlusion detector 1030 generates occlusion location information M1 and M2 according to the received focused images R3 and L3, the location information, and the depth information. The occlusion is the part that is occluded by the object and is only observed by one of the human eyes in the stereoscopic 3D image, which is a part of the scene shot by the sensor array 120 and taken by a part of the image sensor. Take an embodiment shown in FIG. 11 as an example, the focused images R3 and L3 have two objects 1130 and 1140. The focused image L3 includes occlusions 1135 and 1145 and the focused image R3 includes occlusions 1137 and 1147. Since the installing position of the image sensor in the sensor array 120 is different, occlusions may occur on different locations. The closer the occlusion to the lens of the image sensor, the clearer it is.

Modifying the occlusion may make the user observe a more realistic and comfortable 3D image. The 3D image synthesizer 1020 may shift the object in the focused images R3 and L3 a distance according to the occlusion location information M1 and M2, so as to trim the edge of the object to modify the occlusion of the object.

As described above, the 3D image synthesizer 1020 may modify occlusions in the focused images R3 and L3 according to the occlusion location information M1 and M2 of the object, and the 3D image synthesizer 1020 may generate a 3D synthesized image according to the focused images R3 and L3 and at least one of the occlusion location information M1 or M2. Through the image content analysis and object tracking of the image analyzer 140, the detection and processing time of the occlusion can be reduced and the computing amount of occlusion modification can be changed instantaneously to generate stereoscopic 3D image suitable for the observation of human eyes instantaneously.

The display unit 1040 receives the 3D synthesized image from the 3D image synthesizer 1020 and displays the 3D synthesized image in a stereoscopic 3D way. The stereoscopic impression of the stereoscopic 3D image is the degree of the convex-concave of the screen seen by the user. The image processing device 1001 may provide setting options to set the degree of convex or concave for the above stereoscopic impression. The 3D image synthesizer 1020 may adjust the stereoscopic impression shown by the display unit 1040 according to the setting options, and the screen size and resolution of the display unit 1040. The storage unit 170 may receive and store the 3D synthesized image output by the 3D image synthesizer 1020.

Figure 12:
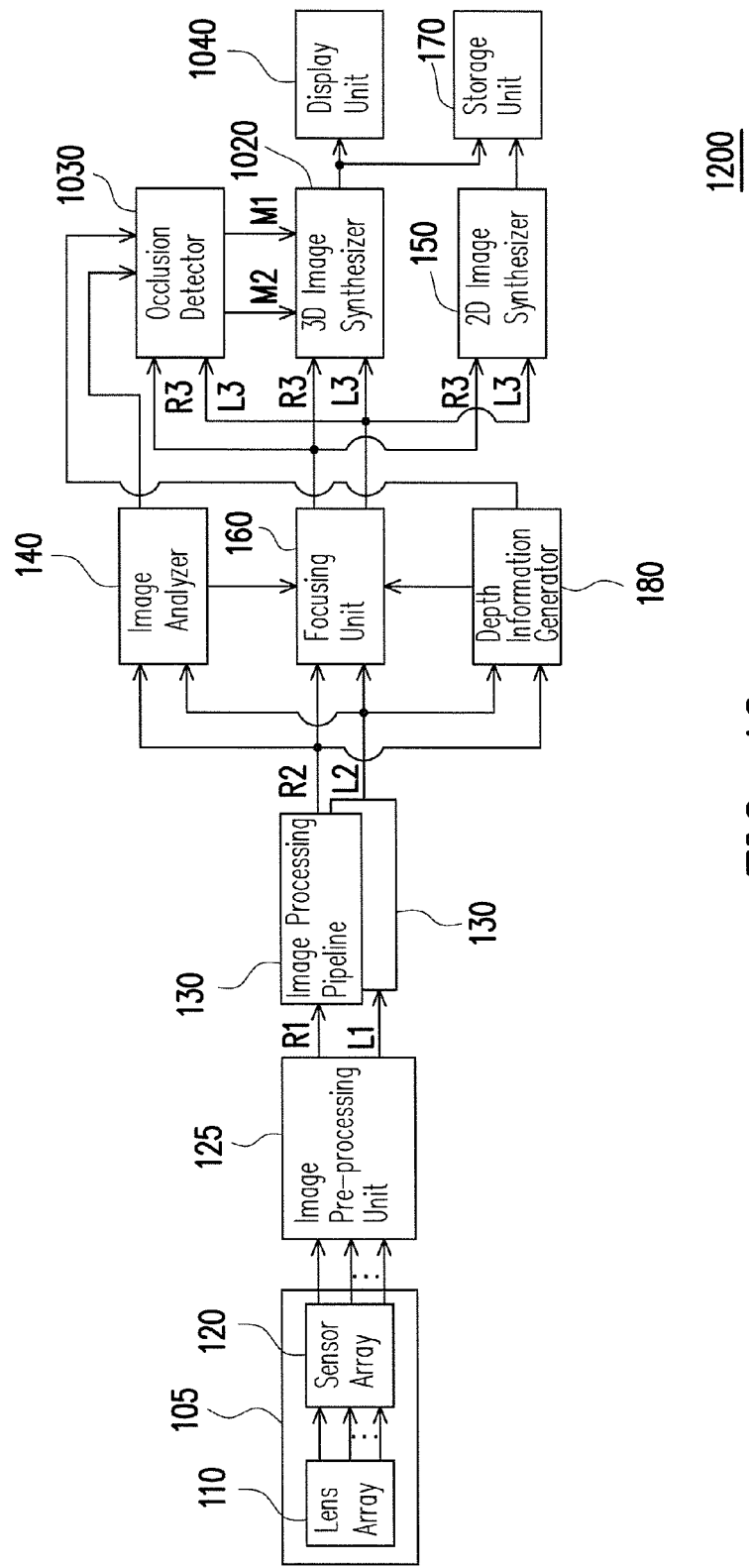
FIG. 12 is a diagram of an image processing device according to another embodiment of the present disclosure.

FIG. 12 is a diagram of an image processing device 1200 according to another embodiment of the present disclosure. The image processing device 1200 is a combination of the image processing device 100 in FIG. 1 and the image processing device 1000 in FIG. 10. Therefore, the image processing device 1200 has all functions of the image processing device 100 and the image processing device 1000. Moreover, the 3D image synthesizer 1020 and the 2D image synthesizer 150 may simultaneously receive the focused images R3 and L3 from the focusing unit 160, so as to respectively generate a 2D synthesized image having depth information and a high resolution and a 3D synthesized image of the object being shot simultaneously. The storage unit 170 may receive and store the 2D synthesized image and the 3D synthesized image.

To sum up, since the image processing devices 100, 1000, and 1200 in the above embodiments employ image processing technique to focus instead of employing a VCM, they are more quiet and faster and save more power than the traditional way employing a VCM. The image processing devices 100, 1000, and 1200 may re-focus on each object of the image after the image had been shot through the focused images, and this may avoid focusing or tracking mistakes caused by man-made shooting. The image processing devices 100, 1000, and 1200 may synthesize multiple images shot simultaneously by the sensor array via HDR technique to extend the range of light and shade in an image, and may synthesize multiple images shot simultaneously by the sensor array via single image enlarging output technique to generate a large-sized 2D image. The image processing devices 1000 and 1200 may detect and modify the occlusion in an image and may adjust the 3D stereoscopic impression of the display unit. All in all, the image processing devices 100, 1000, and 1200 in the embodiments of the present disclosure may provide a 2D image and stereoscopic 3D image more suitable for the observation of human eyes.

What is claimed is:

1. An image processing device comprising:
    an image sensor array including a plurality of image sensors configured to take a plurality of images of a first object and a second object;
    an image pre-processing circuit coupled to the image sensor array and configured to receive the images and process the images to generate a first shift image and a second shift image associated with the first object and the second object;
    a depth information generator coupled to the image pre-processing circuit and configured to generate depth information according to the first shift image and the second shift image, wherein the depth information includes first distance information associated with the first object;
    a focusing circuit coupled to the image pre-processing circuit and the depth information generator and configured to generate a first pair of focused images according to the depth information, the first shift image, and the second shift image, wherein the first pair of focused images have the first object focused thereon;
    a three-dimensional image synthesizer coupled to the focusing circuit and configured to generate a three-dimensional image according to the first pair of focused images and an occlusion location information;
    a two-dimensional image synthesizer coupled to the focusing circuit and configured to generate a two-dimensional image according to the first pair of focused images;
    an occlusion detector coupled to the depth information generator, the focusing circuit and the three-dimensional image synthesizer and configured to generate the occlusion location information corresponding to the first pair of focused images according to the depth information and the first pair of focused images; and
    a display unit coupled to the three-dimensional image synthesizer and configured to display the three-dimensional age in a stereoscopic three-dimensional way.

2. The image processing device according to claim 1, wherein the depth information further includes second distance info nation associated with the second object, and the focusing circuit is further configured to generate a second pair of focused images according to the depth information, the first shift image, and the second shift image, wherein the second pair of focused images have the second object focused thereon.

3. The image processing device according to claim 1, wherein the focusing circuit is further configured to generate the first pair of focused images according to lens parameters associated with the image sensors, wherein each of the lens parameters includes a focal length and a point spread function associated with a lens of the image sensor.

4. The image processing device according to claim 1, wherein the image sensor array further comprises:
    a lens array including a plurality of optical zoom lenses, wherein the optical zoom lenses are disposed in front of the image sensors.

5. The image processing device according to claim 1, wherein the depth information generator comprises:
    a deviation estimator coupled to the image pre-processing circuit and configured to generate deviation information according to the first shift image and the second shift image, wherein the deviation information includes a deviation value between the first object and the second object in the first shift image and the second shift image; and a deviation depth transformer coupled to the deviation estimator and configured to transform the deviation information to the depth information.

6. The image processing device according to claim 5, wherein the depth information generator further comprises:
a post-processor coupled between the deviation estimator and the deviation depth transformer and configured to repair singularity points in the deviation information.

7. The image processing device according to claim 5, wherein the depth information generator further comprises:
a background modelling circuit coupled to the image pre-processing circuit and configured to distinguish a foreground and a background of the first shift image or the second shift image; and
an object contouring circuit coupled to the background modelling circuit and configured to extract an object contour from the foreground.

8. The image processing device according to claim 7, wherein the background modelling circuit is further coupled to the deviation estimator and configured to distinguish the foreground and the background according to the deviation information.

9. The image processing device according to claim 7, wherein the depth information generator further comprises:
an infrared transceiver coupled to the background modelling circuit and configured to transmit an infrared and sense a light spot reflected by the infrared, wherein the background modelling circuit distinguishes the foreground and the background according to the light spot.

10. The image processing device according to claim 7, wherein the depth information generator further comprises:
a color space transformer coupled to the image pre-processing circuit, the deviation estimator and the background modelling circuit and configured to transform the first shift image and the second shift image from a first color space to a second color space, wherein the first color space does not include a luminance component and the second color space includes the luminance component and at least one color component, wherein the deviation estimator generates the deviation information according to the luminance component of the first shift image and the second shift image, and the background modelling unit circuit distinguishes the foreground and the background according to the at least one color component of the first shift image or the second shift image.

11. The image processing device according to claim 1, wherein the image pre-processing circuit is configured to classify the images into a first image group and a second image group, synthesize multiple images in the first image group according to an optical characteristic of each image in the first image group to generate the first shift image, and synthesize multiple images in the second image group according to the optical characteristic of each image in the second image group to generate the second shift image.

12. The image processing device according to claim 1, wherein the images taken by the image sensor array are taken by the image sensors using different exposure values at a same time, and the image pre-processing circuit generates the first shift image and the second shift image by using a high dynamic range technique according to the images.

13. The image processing device according to claim 1 further comprising:
an image analyzer coupled to the image pre-processing circuit and the focusing circuit and configured to identify a location of the first object in the first shift image or the second shift image, so as to generate location information associated with the first object, wherein the focusing circuit further generates the first pair of focused images according to the location information.

14. The image processing device according to claim 1 further comprising:
at least two image processing pipelines coupled between the image pre-processing circuit, the focusing circuit and the depth information generator, respectively, and configured to receive the first shift image and the second shift image, wherein each of the image processing pipelines includes:
a synchronization processing circuit configured to correct a difference between the first shift image and the second shift image, wherein the difference is a shooting time difference, a exposure value difference, a color difference, a white balance difference or a focusing plane difference.

15. The image processing device according to claim 14, wherein each of the image processing pipelines further includes:
a parallax calibration circuit coupled to the synchronization processing circuit and configured to determine a cropping frame on the first shift image or the second shift image according to distances between lenses of the image sensors, cut out a part that is outside the cropping frame on the first shift image or the second shift image and keep a part that is inside the cropping frame on the first shift image or the second shift image.

16. The image processing device according to claim 15, wherein each of the image processing pipelines further includes:
a lens distortion correction circuit coupled to synchronization processing circuit and configured to correct a fish-eye effect in the first shift image or the second shift image.

17. The image processing device according to claim 15, wherein each of the image processing pipelines further includes:
an image rectification circuit coupled to the parallax calibration circuit and configured to rectify a distortion of the first shift image or the second shift image caused by deviations of installing positions or installing angles of the lenses of the image sensors.

18. The image processing device according to claim 1 further comprising:
an image synthesizer coupled to the focusing circuit and configured to generate a synthesized image according to the first pair of focused images.

19. The image processing device according to claim 18, wherein the synthesized image is a two-dimensional image, and the image synthesizer is configured to perform a two-dimensional image interpolation on the first pair of focused images so as to generate the synthesized image, and a resolution of the synthesized image is larger than a resolution of the first pair of focused images.

20. The image processing device according to claim 1, wherein the two-dimensional image synthesizer is configured to perform a two-dimensional image interpolation on the first pair of focused images so as to generate the two-dimensional image, and a resolution of the two-dimensional image is larger than a resolution of the first pair of focused images.

21. The image processing device according to claim 1 further comprising:
a storage unit coupled to the two-dimensional image synthesizer and the three-dimensional image synthesizer and configured to receive and store the two-dimensional image and the three-dimensional image.

* * * * *